(12) United States Patent
Smoot et al.

(10) Patent No.: US 11,465,165 B2
(45) Date of Patent: Oct. 11, 2022

(54) HIGH-VOLUME LOW-PRESSURE END EFFECTOR

(71) Applicant: The Boeing Company, Chicago, IL (US)

(72) Inventors: Colton Massey Smoot, Mount Pleasant, SC (US); Craig Alan Ungerecht, Kirkland, WA (US); Melinda Dae Miller, Snohomish, WA (US); Paul G. Solecki, Bothell, WA (US); David McCaig, Everett, WA (US); Frederick B. Frontiera, Mount Pleasant, SC (US); Adrienne C. Engholm, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 265 days.

(21) Appl. No.: 15/687,477

(22) Filed: Aug. 26, 2017

(65) Prior Publication Data

US 2019/0060940 A1    Feb. 28, 2019

(51) Int. Cl.
*B05B 13/06* (2006.01)
*B05B 13/04* (2006.01)
(Continued)

(52) U.S. Cl.
CPC ............ *B05B 13/0636* (2013.01); *B05B 1/16* (2013.01); *B05B 7/0081* (2013.01);
(Continued)

(58) Field of Classification Search
CPC . B05B 7/0081; B05B 7/0416; B05B 13/0636; B05B 13/005; B05B 13/04;
(Continued)

(56) References Cited

U.S. PATENT DOCUMENTS

| | | | | |
|---|---|---|---|---|
| 1,368,055 A | * | 2/1921 | Reznicek | A62C 31/005 169/37 |
| 4,671,462 A | * | 6/1987 | Badria | B05B 3/008 239/227 |

(Continued)

FOREIGN PATENT DOCUMENTS

| | | |
|---|---|---|
| CN | 102698909 A | 10/2012 |
| CN | 102765091 A | 11/2012 |

(Continued)

OTHER PUBLICATIONS

"Finishing Automation: Automated Paint Systems for Improving Performance and Quality" Graco Inc., copyright 2017, 8 pages, Revision B, Jan. 2017. Electronic Only.

(Continued)

*Primary Examiner* — Christopher R Dandridge
(74) *Attorney, Agent, or Firm* — Yee & Associates, P.C.

(57) ABSTRACT

A high-volume low-pressure end effector is presented. The high-volume low-pressure end effector comprises a connection arm and a spray head. The connection arm comprises a housing with flexible conduits running through the housing. The spray head has integral channels configured to receive air and a fluid from the flexible conduits and deliver the air and the fluid to a number of outlets.

26 Claims, 14 Drawing Sheets

(51) Int. Cl.
- *B25J 11/00* (2006.01)
- *B64F 5/00* (2017.01)
- *B05B 1/16* (2006.01)
- *B05B 7/08* (2006.01)
- *B05B 7/00* (2006.01)
- *B05B 7/04* (2006.01)
- *B05B 13/00* (2006.01)
- *B05B 15/65* (2018.01)

(52) U.S. Cl.
CPC .......... *B05B 7/0416* (2013.01); *B05B 7/0861* (2013.01); *B05B 13/005* (2013.01); *B05B 13/04* (2013.01); *B05B 13/0431* (2013.01); *B05B 13/0627* (2013.01); *B05B 15/65* (2018.02); *B25J 11/0075* (2013.01); *B64F 5/00* (2013.01); *B05B 7/08* (2013.01)

(58) Field of Classification Search
CPC . B05B 13/0431; B05B 13/0627; B05B 13/08; B05B 7/0861; B05B 15/65; B05B 1/16; B64F 5/00; B25J 11/0075
USPC ............................................................ 239/29
See application file for complete search history.

(56) References Cited

U.S. PATENT DOCUMENTS

| | | | | |
|---|---|---|---|---|
| 5,038,810 A * | 8/1991 | Pacheco | B05B 3/06 | 134/167 R |
| 5,096,746 A * | 3/1992 | Strizki | B05B 13/069 | 118/315 |
| 5,220,849 A * | 6/1993 | Lande | B05B 13/005 | 74/479.01 |
| 5,232,739 A * | 8/1993 | Strizki | B05B 13/069 | 118/317 |
| 5,263,646 A * | 11/1993 | McCauley | B05B 15/652 | 239/154 |
| 5,271,564 A * | 12/1993 | Smith | B05B 7/0081 | 239/532 |
| 5,336,321 A * | 8/1994 | Sugata | B05B 13/0431 | 118/315 |
| 5,344,078 A * | 9/1994 | Fritz | B05B 7/0081 | 239/290 |
| 5,366,162 A * | 11/1994 | Strizki | B05B 13/0636 | 118/318 |
| 5,964,407 A * | 10/1999 | Sandkleiva | B05B 12/14 | 239/112 |
| 5,971,298 A * | 10/1999 | Millan | B05B 7/0081 | 239/290 |
| 6,085,994 A * | 7/2000 | Zink | B08B 9/0936 | 239/227 |
| 6,655,606 B2 * | 12/2003 | Earl | B05B 1/1663 | 239/104 |
| 7,350,890 B2 * | 4/2008 | Baird | B41J 3/4073 | 347/2 |
| 8,051,796 B2 * | 11/2011 | Clifford | B05B 5/1625 | 118/323 |
| 8,313,047 B2 * | 11/2012 | Micheli | B05B 15/63 | 239/526 |
| 8,455,054 B2 * | 6/2013 | Brewer | B05B 13/005 | 427/402 |
| 8,550,176 B2 * | 10/2013 | Knobloch, Jr. | E21B 21/103 | 166/386 |
| 8,857,877 B2 * | 10/2014 | Lin | B25J 15/0061 | 269/71 |
| 8,888,015 B2 * | 11/2014 | Rayner | B05B 15/40 | 239/106 |
| 9,278,367 B2 * | 3/2016 | Cooper | B05B 12/004 | |
| 9,308,543 B1 * | 4/2016 | Smith | B05B 1/02 | |
| 9,656,394 B2 * | 5/2017 | Lin | B25J 15/0061 | |
| 2009/0194922 A1 * | 8/2009 | Lin | B25J 15/0052 | 269/55 |
| 2010/0015892 A1 * | 1/2010 | Vijay | B05B 1/083 | 451/36 |
| 2010/0180711 A1 * | 7/2010 | Kilibarda | B05C 5/0216 | 74/490.06 |
| 2011/0121099 A1 * | 5/2011 | Han | A62C 31/05 | 239/263 |
| 2011/0282381 A1 * | 11/2011 | Cronin | A61B 10/0275 | 606/213 |
| 2014/0356533 A1 * | 12/2014 | Harmat | E21B 43/08 | 427/244 |
| 2016/0130017 A1 * | 5/2016 | Best | B05B 13/005 | |
| 2016/0305891 A1 * | 10/2016 | Olsson | G01N 21/954 | |
| 2016/0367931 A1 * | 12/2016 | Yin | B05B 1/14 | |
| 2017/0106393 A1 * | 4/2017 | Hampson | B25J 11/0075 | |
| 2017/0173617 A1 * | 6/2017 | Zilai | B05B 15/68 | |
| 2017/0259309 A1 * | 9/2017 | Innes | B08B 9/0933 | |
| 2017/0297250 A1 * | 10/2017 | Tyler | B29C 48/305 | |
| 2017/0361346 A1 * | 12/2017 | Lahidjanian | B05B 1/14 | |
| 2018/0038646 A1 * | 2/2018 | VanderPyl | B05B 15/65 | |
| 2018/0106565 A1 * | 4/2018 | Tischler | B05B 3/06 | |
| 2018/0111167 A1 * | 4/2018 | Becker | B05B 3/06 | |
| 2018/0133738 A1 * | 5/2018 | Endo | B05B 3/02 | |
| 2018/0161788 A1 * | 6/2018 | Wiggins | B05B 1/14 | |
| 2018/0185867 A1 * | 7/2018 | Klimesch | B05B 7/224 | |
| 2018/0369838 A1 * | 12/2018 | Saratani | B08B 3/02 | |
| 2019/0099770 A1 * | 4/2019 | Utsumi | C23C 4/12 | |
| 2019/0126297 A1 * | 5/2019 | Wagner | B05B 3/0409 | |
| 2019/0161955 A1 * | 5/2019 | Grantham | B05B 15/656 | |

FOREIGN PATENT DOCUMENTS

| | | |
|---|---|---|
| CN | 102765094 A | 11/2012 |
| DE | 19914040 A1 | 10/2000 |
| DE | 10056040 A1 | 6/2002 |
| EP | 2500104 A1 | 9/2012 |

OTHER PUBLICATIONS

"Automatic AirPro Spray Guns" Instructions-Parts Manual, Graco Inc., copyright 2016, 44 pages, Revision H, Mar. 2017.

European Patent Office Communication and Extended Search Report, dated Dec. 3, 2018, regarding Application No. 18178242.6, 9 pages.

European Patent Office Communication, dated Feb. 21, 2020, regarding Application No. 18178242.6, 6 pages.

European Patent Office Communication, dated Oct. 13, 2020, regarding Application No. 18178242.6, 5 pages.

China National Intellectual Property Administration, First Notification of Office Action, Search Report, and English Transaction, dated Mar. 3, 2021, regarding Application No. 201810749096.X, 19 pages.

* cited by examiner

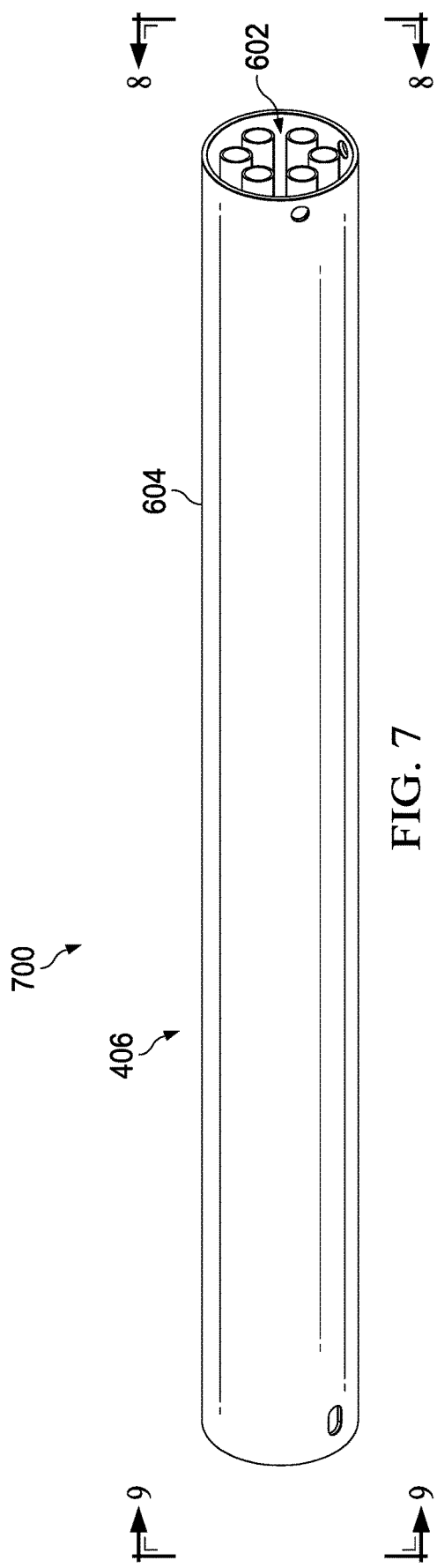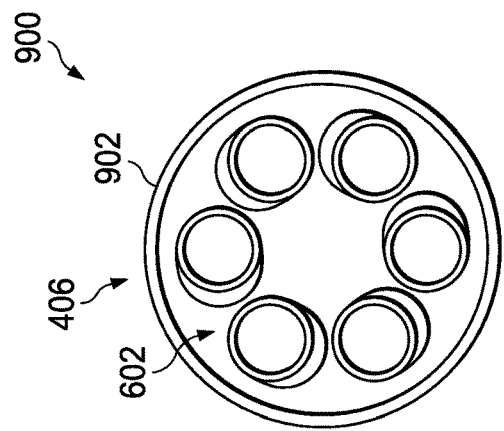
FIG. 7
FIG. 8
FIG. 9

HIGH-VOLUME LOW-PRESSURE END EFFECTOR

BACKGROUND INFORMATION

1. Field

The present disclosure relates generally to performing manufacturing operations on components, and more specifically, to applying a fluid to a component. Still more particularly, the present disclosure relates to a high-volume low-pressure end effector configured to apply a fluid to a component.

2. Background

Spray applicators apply a fluid coating to a component by propelling and directing the fluid with air. A percentage of the fluid coating will become airborne within the manufacturing environment. Sprayed fluid coating not applied to a component may result in overspray. Overspray produces additional material cost. Overspray may also settle on surrounding structures in the manufacturing environment. The fraction of sprayed fluid coating applied to a component may be described as a coverage percentage.

Applying a fluid coating inside tight areas of enclosures using spray end effectors may result in less than desirable coverage. For example, applying a fluid coating inside tight areas of enclosures may impact ability to access and spray adequately all surfaces using spray end effectors. Maneuvering spray end effectors may be undesirably difficult within tight areas of enclosures.

Manually applying a fluid coating inside tight areas of enclosures may take an undesirably large amount of time. Manually applying a fluid coating inside tight areas of enclosures may take an undesirably large number of human operators. Manually applying a fluid coating using human operators may cause an undesirable amount of exposure to the fluid coating or components of the fluid coating for the human operators.

Therefore, it would be desirable to have a method and apparatus that take into account at least some of the issues discussed above, as well as other possible issues. For example, it would be desirable to reduce the amount of overspray in a coating system for tight areas of enclosures. Also, it would be desirable to reduce the amount of airborne fluid within a manufacturing environment when applying a coating to tight areas of enclosures. It would be desirable to provide an apparatus to increase the coverage of a coating within tight areas of enclosures.

SUMMARY

An illustrative embodiment of the present disclosure provides a high-volume low-pressure end effector. The high-volume low-pressure end effector comprises a connection arm and a spray head. The connection arm comprises a housing with flexible conduits running through the housing. The spray head has integral channels configured to receive air and a fluid from the conduits and deliver the air and the fluid to a number of outlets.

Another illustrative embodiment of the present disclosure provides a method. A fluid and air are supplied through flexible conduits running through a housing of a connection arm to a spray head with integral channels configured to receive the air and the fluid from the conduits and deliver the air and the fluid to a number of outlets of the spray head, wherein the connection arm and spray head are components of a high-volume low-pressure end effector. The fluid is sprayed from at least one outlet of the number of outlets and onto surfaces of an enclosure of a structure with a total coverage of at least 90 percent.

A further illustrative embodiment of the present disclosure provides a high-volume low-pressure end effector. The high-volume low-pressure end effector comprises an attachment bracket, a connection arm, fittings, and a spray head. The attachment bracket covers valves for air and fluid. The connection arm comprises a hollow metal housing with flexible conduits running through the housing. The flexible conduits carry the air and the fluid. The fittings connect the flexible conduits to integral channels within a spray head. The spray head has integral channels delivering fluid and air to a number of outlets.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of an isometric view of a connection arm in accordance with an illustrative embodiment;

FIG. 8 is an illustration of a front view of a connection arm in accordance with an illustrative embodiment;

FIG. 9 is an illustration of a back view of a connection arm in accordance with an illustrative embodiment;

DETAILED DESCRIPTION

The illustrative embodiments recognize and take into account one or more different considerations. For example, the illustrative embodiments recognize and take into account that spar cavities are large enclosures with tight areas for coating coverage.

The illustrative embodiments also recognize and take into account that conventional end effectors provide a low effective coverage of the spar cavities. The illustrative embodiments recognize and take into account that some conventional end effectors provide approximately 20 percent coverage within spar cavities.

The illustrative embodiments recognize and take into account that low coverage leads to low utilization of the robotic system. The illustrative embodiments recognize and take into account that the low coverage leads to increased flow time. The illustrative embodiments recognize and take into account that low coverage may result in a large amount of manual touch-up.

The illustrative embodiments recognize and take into account that many available spray paints, pigments, and other coatings contain hexavalent chromium. The illustrative embodiments recognize and take into account that minimizing human operator exposure to hexavalent chromium is desirable. The illustrative embodiments thus recognize and take into account that automating application of paints, pigments, and other coatings is desirable.

The illustrative embodiments recognize and take into account that some conventional end effectors are made from machined aluminum. The illustrative embodiments recognize and take into account that conventional end effectors with machined aluminum blocks are heavier than robotic arm operating payload standards. The illustrative examples recognize and take into account that because some conventional end effectors are mostly machined billet aluminum, components of these end effector may be undesirably difficult or expensive to find and replace.

Figure 1:
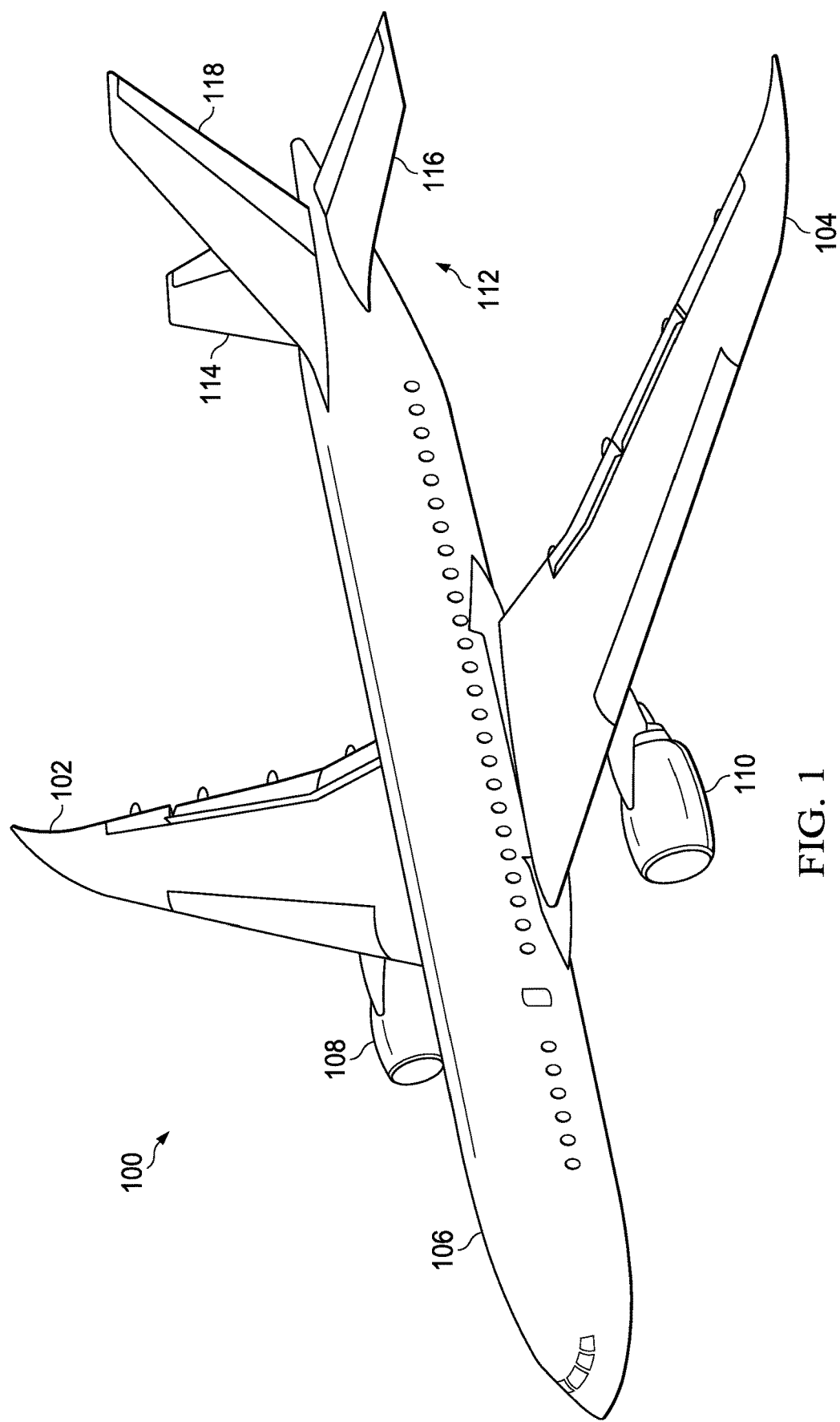
FIG. 1 is an illustration of an aircraft in which an illustrative embodiment may be implemented.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which components coated using a high-volume low-pressure end effector may be implemented in accordance with an illustrative embodiment. For example, a high-volume low-pressure end effector may be used to apply coatings within wing spar cavities of at least one of wing 102 or wing 104.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

This illustration of aircraft 100 is provided for the purposes of illustrating one environment in which different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, rotorcraft, or other suitable types of aircraft.

Although the illustrative examples for an illustrative embodiment are described with respect to an aircraft, the illustrative embodiments may be applied to other types of structures. The structure may be, for example, a mobile structure, a stationary structure, a land-based structure, an aquatic-based structure, or a space-based structure. More specifically, the structure may be a surface ship, a tank, a personnel carrier, a train, a spacecraft, a space station, a satellite, a submarine, a manufacturing facility, a building, or other suitable types of structures.

Figure 2:
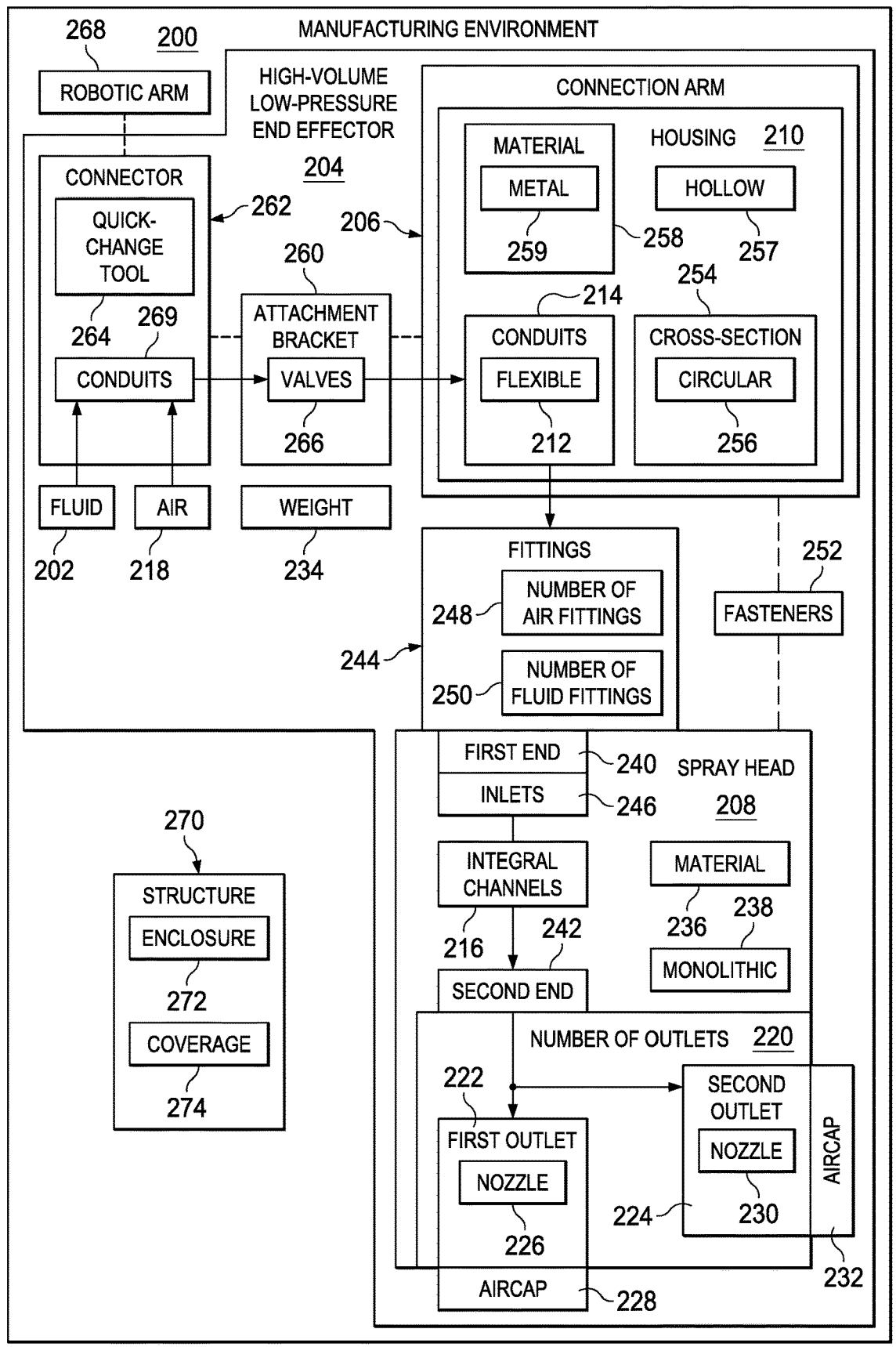
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an illustrative example of an environment in which components of aircraft 100 may be processed. For example, fluid 202 may be applied to components of aircraft 100 using high-volume low-pressure end effector 204 in manufacturing environment 200.

High-volume low-pressure end effector 204 comprises connection arm 206 and spray head 208. Connection arm 206 comprises housing 210 with flexible 212 conduits 214 running through housing 210. Spray head 208 has integral channels 216 configured to receive air 218 and fluid 202 from conduits 214 and deliver air 218 and fluid 202 to number of outlets 220.

As used herein, a "number of items" means one or more items. For example, number of outlets 220 has one or more outlets.

In some illustrative examples, number of outlets 220 comprises first outlet 222 and second outlet 224 connected to integral channels 216. First outlet 222 and second outlet 224 may have any desirable orientation relative to each other. First outlet 222 and second outlet 224 may be positioned anywhere from approximately zero degrees to approximately one hundred eighty degrees relative to each other. In some illustrative examples, first outlet 222 and second outlet 224 are pointed ninety degrees relative to each other. In other illustrative examples, first outlet 222 and second outlet 224 are pointed approximately one hundred eighty degrees relative to each other.

High-volume low-pressure end effector 204 comprises a respective nozzle and aircap for each of first outlet 222 and second outlet 224. As depicted, nozzle 226 and aircap 228 are associated with first outlet 222. Nozzle 230 and aircap 232 are associated with second outlet 224. In some illustrative examples, high-volume low-pressure end effector 204 comprises a respective aircap threaded on to each of number of outlets 220, wherein each respective aircap encloses a respective nozzle within each of number of outlets 220.

Nozzle 226 and aircap 228 enable high-volume low-pressure application of fluid 202. Nozzle 226 pressurizes fluid 202 and distributes the atomized fluid to aircap 228. Aircap 228 allows pass-through of fluid 202 and distributes the atomized fluid to manufacturing environment 200. Nozzle 226 and aircap 228 enable high-volume low-pressure spray of fluid 202 from first outlet 222.

Nozzle 230 and aircap 232 enable high-volume low-pressure application of fluid 202. Nozzle 230 pressurizes fluid 202 and distributes the pressurized fluid to aircap 232. Aircap 232 allows pass-through of fluid 202 and distributes the atomized fluid to manufacturing environment 200. Nozzle 230 and aircap 232 enable high-volume low-pressure spray of fluid 202 from second outlet 224.

A combination of aircap 228 and spray head 208 holds and seals nozzle 226 within first outlet 222. In some illustrative examples, aircap 228 is threaded onto spray head 208 to seal aircap 228 against spray head 208. In this illustrative example, additional sealing components such as o-rings or other sealing components are not used to seal aircap 228 to spray head 208. By not using additional sealing components, weight 234 of high-volume low-pressure end effector 204 may be reduced. By not using additional sealing components, maintenance time of high-volume low-pressure end effector 204 may be reduced.

A combination of aircap 232 and spray head 208 holds and seals nozzle 230 within second outlet 224. In some illustrative examples, aircap 232 is threaded onto spray head 208 to seal aircap 232 against spray head 208. In this illustrative example, additional sealing components such as o-rings or other sealing components are not used to seal aircap 232 to spray head 208.

Integral channels 216 distribute air 218 and fluid 202 to the nozzles associated with spray head 208. Integral channels 216 distribute air 218 and fluid 202 to nozzle 226 and nozzle 230.

Spray head 208 is formed of any desirable material. Material 236 is selected to be compatible with use of fluid 202. When fluid 202 is paint, material 236 is selected to be paint compatible. For example, material 236 is selected to not be reactive to fluid 202 or to solvents used to remove fluid 202 from spray head 208. In one illustrative example, material 236 is stainless steel.

In some illustrative examples, spray head 208 is monolithic 238. When spray head 208 is monolithic 238, spray head 208 is one indivisible component.

Spray head 208 may be manufactured using any desirable method. In some illustrative examples, spray head 208 is formed using an additive manufacturing method. In some other illustrative examples, spray head 208 is formed by machining. In yet other illustrative examples, spray head 208 may be formed by molding or other manufacturing techniques. In some illustrative examples, a manufacturing technique for creating spray head 208 is selected based on at least one of a desirable manufacturing time, a desirable manufacturing cost, a desirable manufacturing accuracy, or any other manufacturing factors.

Integral channels 216 extend from first end 240 of spray head 208 towards second end 242 of spray head 208. First end 240 is opposite second end 242 of spray head 208. Integral channels 216 have any desirable shape and size to deliver air 218 and fluid 202 to number of outlets 220.

Fittings 244 connect conduits 214 in connection arm 206 to integral channels 216 of spray head 208. Fittings 244 are associated with inlets 246 of integral channels 216 at first end 240 of spray head 208. Fittings 244 are physically connected to integral channels 216 using any desirable type of connection. In some illustrative examples, fittings 244 are threaded. In these illustrative examples, torque is applied to secure fittings 244 to spray head 208.

In high-volume low-pressure end effector 204, fittings 244 comprise number of air fittings 248 and number of fluid fittings 250. In some illustrative examples, number of air fittings 248 comprises two air fittings per outlet, and wherein number of fluid fittings 250 comprises one fluid fitting per outlet. In these illustrative examples, a first air fitting supplies air 218 to atomize fluid 202 exiting the respective nozzle. In these illustrative examples, a second air fitting supplies air 218 to form shaping air streams. The second air fitting provides shaping air streams to control application of fluid 202 and evenly distribute fluid 202.

The quantity of conduits 214 is any desirable quantity. In some illustrative examples, the quantity of conduits 214 is equal to the quantity of fittings 244.

In some illustrative examples, the quantity of conduits 214 is affected by the quantity of outlets in number of outlets 220. For example, each outlet of number of outlets 220 will receive air 218 and fluid 202. The quantity of conduits 214 will be sufficient to provide air 218 and fluid 202 to each outlet of number of outlets 220.

When number of outlets 220 is one outlet, conduits 214 contains at least one conduit with fluid 202 and at least two conduits with air 218. When number of outlets 220 is two outlets, conduits 214 contains at least two conduits with fluid 202 and at least four conduits with air 218.

Spray head 208 is replaceable. In some illustrative examples, spray head 208 may be replaced with a spray head with a different quantity of outlets. In these illustrative examples, conduits 214 may remain in housing 210 after spray head 208 is replaced. In these illustrative examples, conduits 214 may contain a larger quantity of conduits than a quantity of outlets or a quantity of nozzles in the replacement spray head.

First end 240 of spray head 208 is connected to connection arm 206. Spray head 208 is connected to connection arm 206 using fasteners 252. In some illustrative examples, the connection between connection arm 206 and spray head 208 has a minimal quantity of fasteners 252. A minimal quantity of fasteners 252 may reduce weight 234 of high-volume low-pressure end effector 204. A minimal quantity of fasteners 252 may also reduce maintenance time for high-volume low-pressure end effector 204. Fasteners 252 are selected to not extend from connection arm 206 an undesirable amount.

In some illustrative examples, first end 240 is inserted into housing 210 prior to connecting spray head 208 and connection arm 206. In some illustrative examples, spray head 208 reduces in cross-sectional area moving from first end 240 to second end 242. By reducing in cross-sectional area, spray head 208 may maneuver within tight areas more easily.

Connection arm 206 has housing 210. Housing 210 has cross-section 254. Cross-section 254 is selected to accommodate conduits 214. In some illustrative examples, cross-section 254 is selected to reduce chances of collision of housing 210 during rotation.

In some illustrative examples, cross-section 254 is circular 256. In these illustrative examples, housing 210 has circular 256 cross-section 254. When cross-section 254 is circular 256, deflection is lower than for cross-sections with sharp corners.

In some illustrative examples, housing 210 is hollow 257 to accommodate conduits 214. In some illustrative examples, housing 210 is hollow 257 to reduce weight 234 of high-volume low-pressure end effector 204.

Connection arm 206 is formed of material 258. Connection arm 206 may be formed of any desirable material. In some illustrative examples, material 258 of housing 210 is selected based on at least one of strength, rigidity, or weight. In some illustrative examples, material 258 of housing 210 is metal 259. In some illustrative examples, housing 210 is hollow 257 metal 259 housing 210. In one illustrative example, housing 210 may be formed of aluminum.

Attachment bracket 260 attaches connection arm 206 to connector 262. Attachment bracket 260 is designed to reduce weight 234 of high-volume low-pressure end effector 204. Attachment bracket 260 may take the form of a number of hollow components fastened together.

Valves 266 control the flow of fluid 202 and air 218 through high-volume low-pressure end effector 204. In this illustrative example, valves 266 are positioned within attachment bracket 260. By positioning valves 266 near robotic arm 268, movement of robotic arm 268 is easier. Positioning valves 266 within attachment bracket 260 creates a reduced moment of inertia for robotic arm 268 and high-volume low-pressure end effector 204.

Connector 262 connects high-volume low-pressure end effector 204 to robotic arm 268. When connector 262 is quick-change tool 264, high-volume low-pressure end effector 204 may be quickly removed from robotic arm 268. Conduits 269 within connector 262 pass fluid 202 and air 218 through connector 262.

Robotic arm 268 maneuvers high-volume low-pressure end effector 204 within manufacturing environment 200. Robotic arm 268 is used to maneuver high-volume low-pressure end effector 204 to spray fluid 202 onto portions of structure 270.

Structure 270 has enclosure 272. Robotic arm 268 maneuvers high-volume low-pressure end effector 204 within enclosure 272 to apply fluid 202 to enclosure 272 with coverage 274. Coverage 274 is within a desirable range. In some illustrative examples, coverage 274 is desirably above 80 percent. In some illustrative examples, coverage 274 is desirably above 90 percent. In some illustrative examples, coverage 274 may be about 95 percent.

In one illustrative example, high-volume low-pressure end effector 204 comprises attachment bracket 260 containing valves 266 for air 218 and fluid 202; connection arm 206 comprising hollow 257 metal 259 housing 210 with flexible 212 conduits 214 running through housing 210; flexible 212 conduits 214 carrying air 218 and fluid 202; fittings 244 connecting flexible 212 conduits 214 to integral channels 216 within spray head 208; and spray head 208 having integral channels 216 delivering fluid 202 and air 218 to number of outlets 220.

The illustration of manufacturing environment 200 in FIG. 2 is not meant to imply physical or architectural limitations to the manner in which an illustrative embodiment may be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment.

Number of outlets 220 of spray head 208 has any desirable quantity of outlets. In some illustrative examples, number of outlets 220 may have only one outlet. In other illustrative examples, number of outlets 220 may have more than two outlets.

Figure 3:
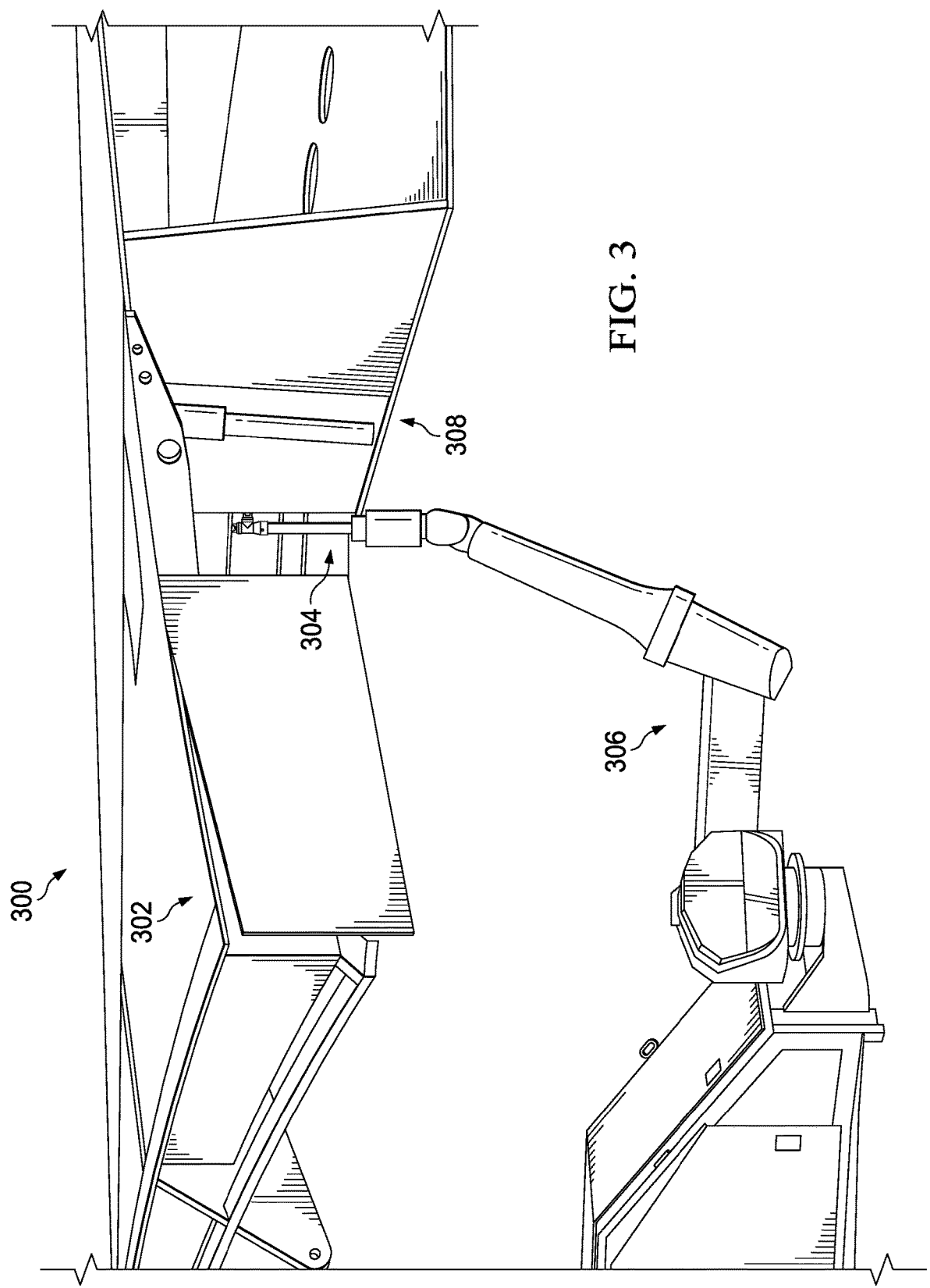
FIG. 3 is an illustration of a manufacturing environment in accordance with an illustrative embodiment.

Turning now to FIG. 3, an illustration of a manufacturing environment is depicted in accordance with an illustrative embodiment. Manufacturing environment 300 is a physical implementation of manufacturing environment 200 of FIG. 2. Wing 302 in manufacturing environment 300 may be one of wing 102 or wing 104 of aircraft 100 in FIG. 1.

As depicted, high-volume low-pressure end effector 304 is connected to robotic arm 306. High-volume low-pressure end effector 304 is a physical implementation of high-volume low-pressure end effector 204 of FIG. 2. High-volume low-pressure end effector 304 is positioned within wing spar cavity 308 of wing 302. During operation, high-volume low-pressure end effector 304 will be maneuvered by robotic arm 306 to apply a coating, such as paint or other desirable coating, to wing spar cavity 308.

Figure 4:
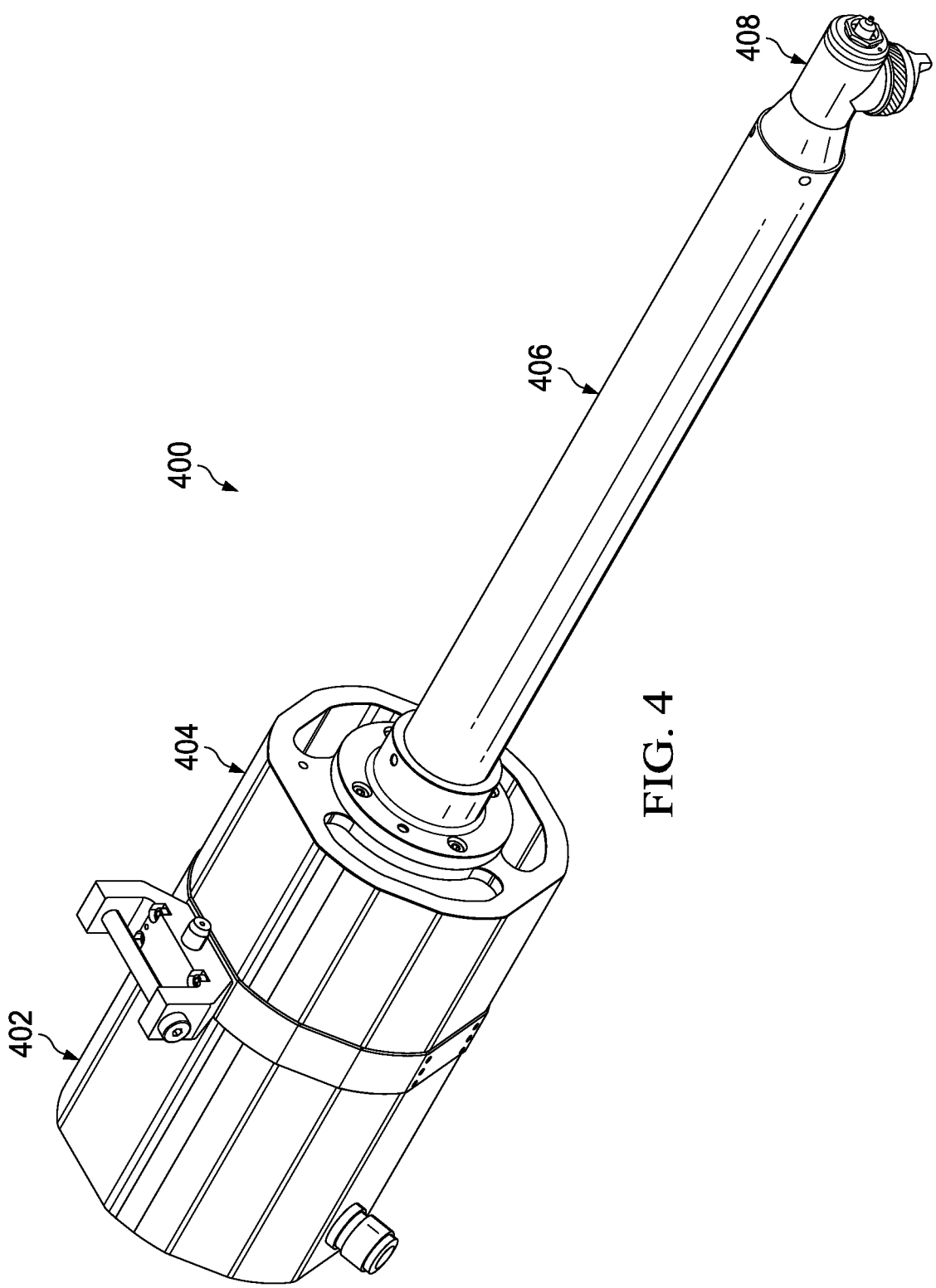
FIG. 4 is an illustration of an isometric view of a high-volume low-pressure end effector in accordance with an illustrative embodiment.

Turning now to FIG. 4, an illustration of an isometric view of a high-volume low-pressure end effector is depicted in accordance with an illustrative embodiment. High-volume low-pressure end effector 400 is a physical implementation of high-volume low-pressure end effector 204 of FIG. 2. High-volume low-pressure end effector 400 may be used to apply a coating to a component of aircraft 100 of FIG. 1. High-volume low-pressure end effector 400 may be a physical implementation of high-volume low-pressure end effector 304 of FIG. 3.

High-volume low-pressure end effector 400 comprises connector 402, attachment bracket 404, connection arm 406, and spray head 408. Connector 402 is used to connect high-volume low-pressure end effector 400 to a robotic arm, such as robotic arm 306 of FIG. 3. In some illustrative examples, connector 402 is a quick-change connector.

Attachment bracket 404 attaches connection arm 406 to connector 402. In some illustrative examples, attachment bracket 404 encompasses valves to control spray of fluid from high-volume low-pressure end effector 400.

Connection arm 406 lengthens high-volume low-pressure end effector 400. Connection arm 406 has a desirable length to position spray head 408 within tight areas of enclosures. A cross-section of connection arm 406 is configured to maneuver spray head 408 within tight areas of enclosures.

Figure 5:
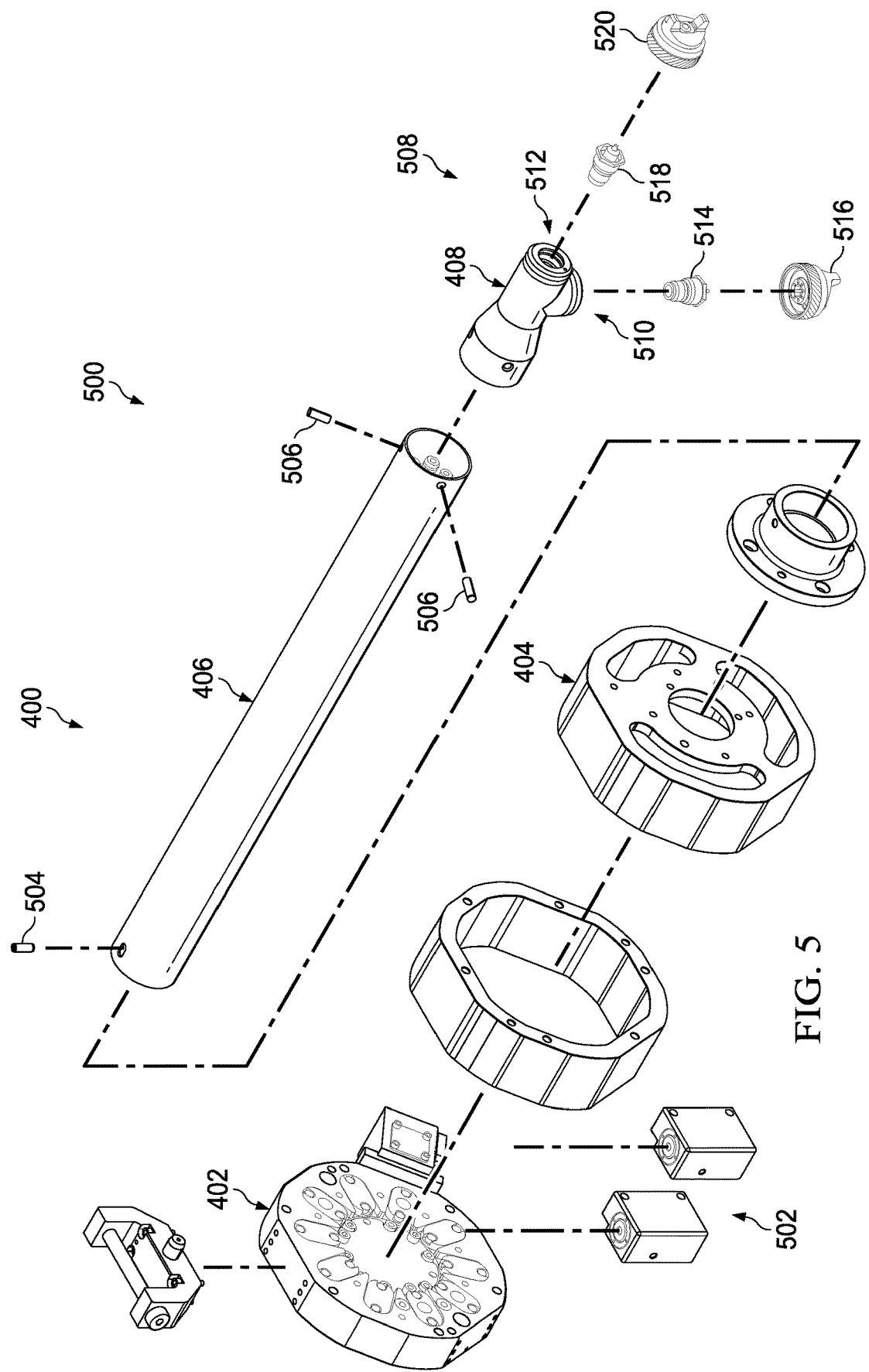
FIG. 5 is an illustration of an exploded view of a high-volume low-pressure end effector in accordance with an illustrative embodiment.

Turning now to FIG. 5, an illustration of an exploded view of a high-volume low-pressure end effector is depicted in accordance with an illustrative embodiment. View 500 is an exploded view of high-volume low-pressure end effector 400 of FIG. 4. In view 500, valves 502 are visible.

In view 500, pins 504 connecting connection arm 406 to attachment bracket 404 are visible. Pins 504 are configured to provide a desired alignment of spray head 408 within high-volume low-pressure end effector 400.

Pins 504 may have any desirable quantity of pins. In some illustrative examples, pins 504 have a minimal quantity of pins.

In view 500, pins 506 connecting spray head 408 to connection arm 406 are visible. Pins 506 are configured to provide a desired alignment of spray head 408 within high-volume low-pressure end effector 400. Pins 506 may have any desirable quantity of pins. In some illustrative examples, pins 506 have a minimal quantity of pins.

In view 500, number of outlets 508 of spray head 408 is visible. In this illustrative example, number of outlets 508 includes first outlet 510 and second outlet 512.

As depicted, high-volume low-pressure end effector 400 also has a respective nozzle and a respective aircap for each of first outlet 510 and second outlet 512. Nozzle 514 and aircap 516 are associated with first outlet 510. Nozzle 518 and aircap 520 are associated with second outlet 512.

Figure 6:
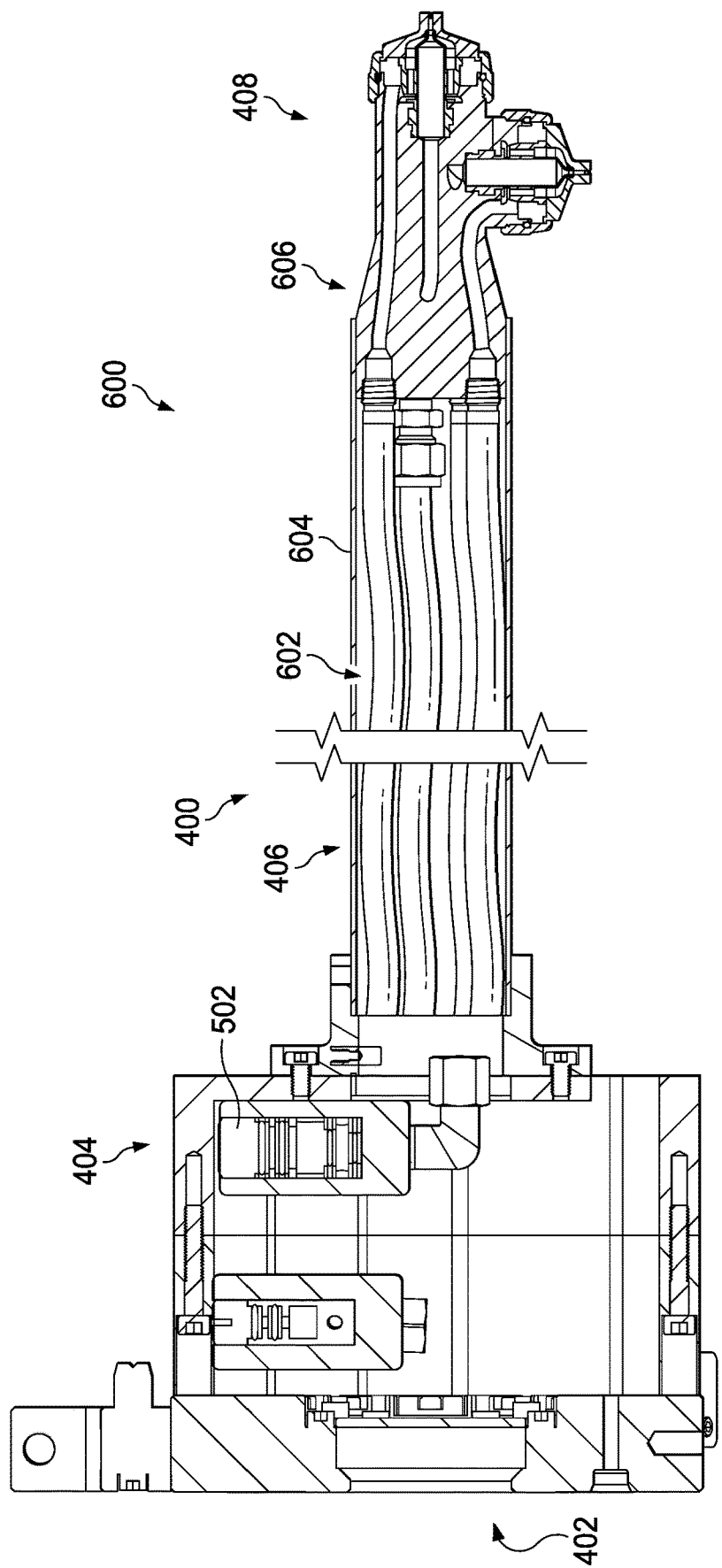
FIG. 6 is an illustration of a cross-sectional view of a high-volume low-pressure end effector in accordance with an illustrative embodiment.

Turning now to FIG. 6, an illustration of a cross-sectional view of a high-volume low-pressure end effector is depicted in accordance with an illustrative embodiment. View 600 is a cross-sectional view of high-volume low-pressure end effector 400 of FIG. 4.

In view 600, valves 502 controlling the flow of fluid and air through high-volume low-pressure end effector 400 are visible within attachment bracket 404. Valves 502 control the flow of fluid and air through flexible conduits 602 running through housing 604 of connection arm 406. Spray head 408 has integral channels 606 configured to receive air and fluid from flexible conduits 602 and deliver the air and fluid to number of outlets 508.

Turning now to FIG. 7, an illustration of an isometric view of a connection arm is depicted in accordance with an illustrative embodiment. View 700 is an isometric view of connection arm 406 of FIG. 4.

Connection arm 406 comprises housing 604 with flexible conduits 602 running through housing 604. As depicted, housing 604 is hollow. In some illustrative examples, housing 604 is a hollow metal housing.

Figure 11:
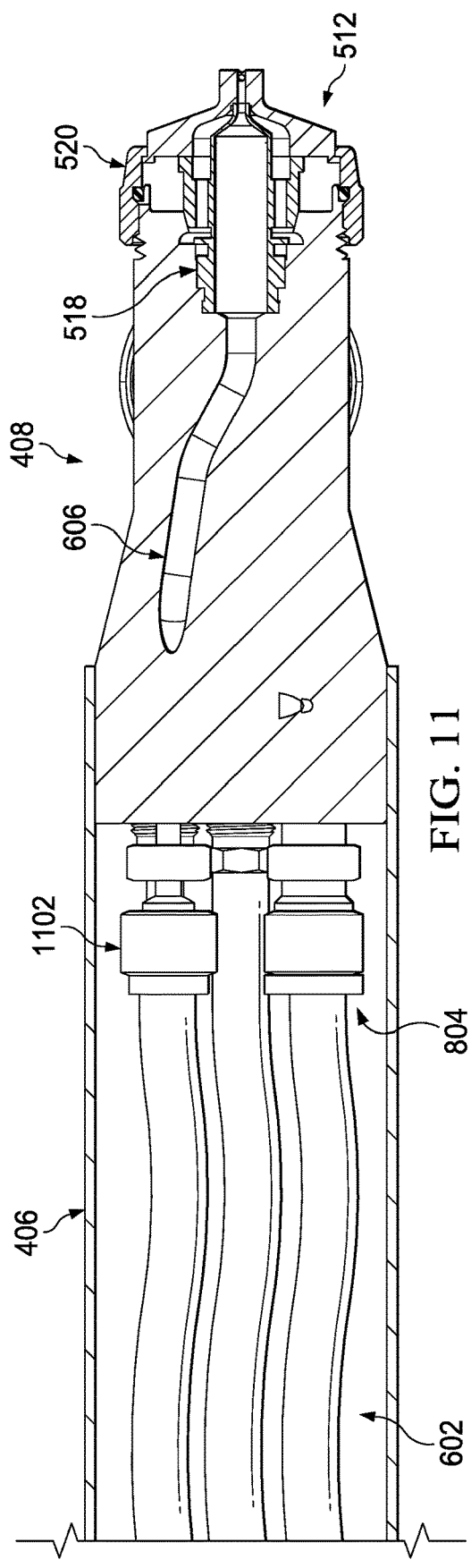
FIG. 11 is an illustration of a cross-sectional view of a connection arm connected to a spray head in accordance with an illustrative embodiment.

Flexible conduits 602 will be connected to fittings 1102 of spray head 408 depicted in FIG. 11. In this illustrative example, the quantity of flexible conduits 602 is the same as quantity of fittings 1102. In some illustrative examples, when a spray head other than spray head 408 is used, the quantity of flexible conduits 602 may be greater than fittings of a spray head.

As depicted, flexible conduits 602 comprises six conduits. Flexible conduits 602 includes three conduits for each outlet of spray head 408. Flexible conduits 602 comprises one fluid conduit and two air conduits for each outlet of spray head 408.

In other illustrative examples, spray head 408 may include a different quantity of outlets. For example, spray head 408 may have more than two outlets. In some illustrative examples, when spray head 408 has more than two outlets, the quantity of flexible conduits 602 will be greater than six. In one illustrative example, when spray head 408 has three outlets, the quantity of flexible conduits 602 will be nine flexible conduits. When spray head 408 has less than two outlets, the quantity of flexible conduits 602 may be less than six. In some illustrative examples, spray head 408 may only have one outlet. In this illustrative example, quantity of flexible conduits 602 may be three.

Turning now to FIG. 8, an illustration of a front view of a connection arm is depicted in accordance with an illustrative embodiment. View 800 is a view from direction 8 of FIG. 7. View 800 is a front view of connection arm 406 of FIG. 4.

View 800 is a view of end 802 of connection arm 406 that will connect to spray head 408. In view 800, ends 804 of flexible conduits 602 are visible. Ends 804 will be connected to fittings (not depicted) of spray head 408 of FIG. 4.

Turning now to FIG. 9, an illustration of a back view of a connection arm is depicted in accordance with an illustrative embodiment. View 900 is a view from direction 9 of FIG. 7. View 900 is a back view of connection arm 406 of FIG. 4. View 900 is a view of end 902 of connection arm 406 that will connect to attachment bracket 404.

Figure 10:
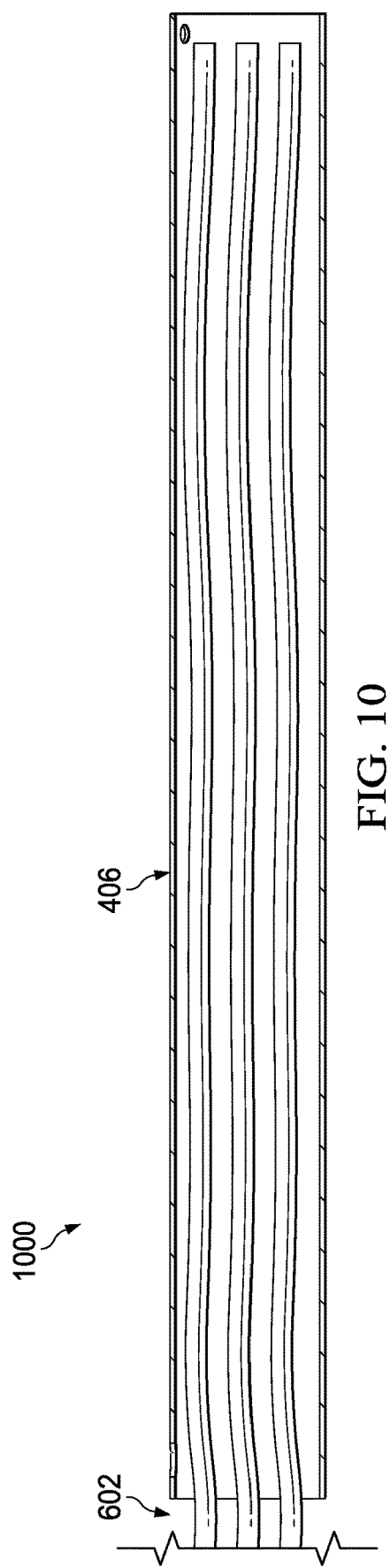
FIG. 10 is an illustration of a cross-sectional view of a connection arm in accordance with an illustrative embodiment.

Turning now to FIG. 10, an illustration of a cross-sectional view of a connection arm is depicted in accordance with an illustrative embodiment. View 1000 is a cross-sectional view of connection arm 406 of FIG. 4.

Turning now to FIG. 11, an illustration of a cross-sectional view of a connection arm connected to a spray head is depicted in accordance with an illustrative embodiment. View 1100 is a cross-sectional view of connection arm 406 connected to spray head 408 of FIG. 4.

In view 1100, ends 804 of flexible conduits 602 are connected to fittings 1102 of spray head 408. Fittings 1102 form connections between flexible conduits 602 and integral channels 606.

Figure 12:
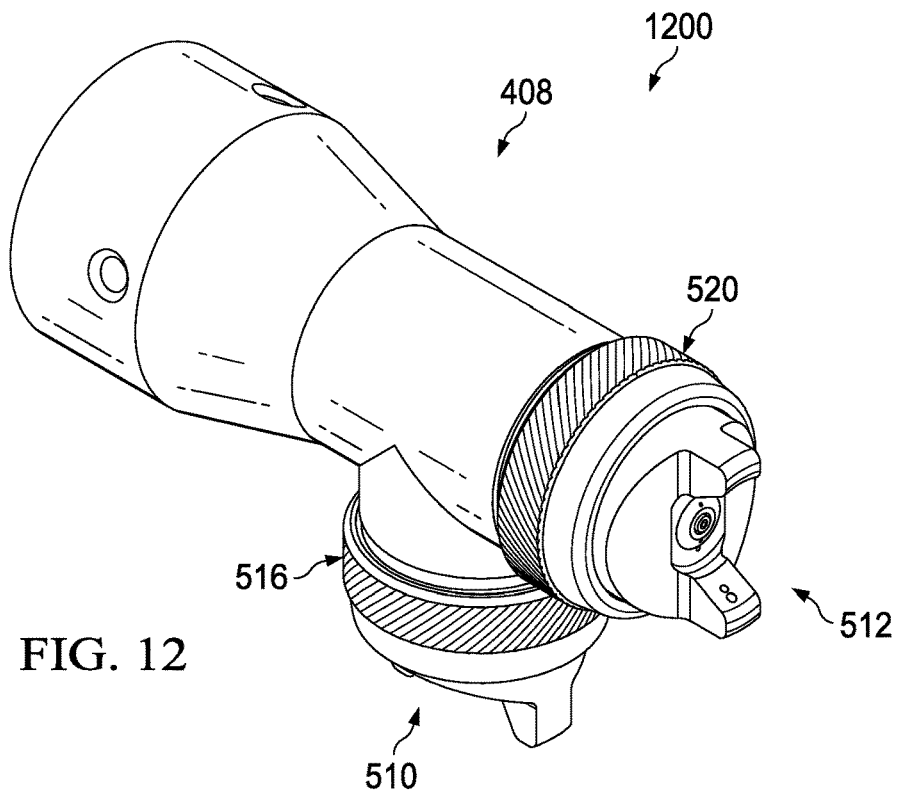
FIG. 12 is an illustration of an isometric view of a spray head with nozzles and aircaps in accordance with an illustrative embodiment.

Turning now to FIG. 12, an illustration of an isometric view of a spray head with nozzles and aircaps is depicted in accordance with an illustrative embodiment. View 1200 is an isometric view of spray head 408 separate from the remainder of high-volume low-pressure end effector 400.

In view 1200, aircap 516 is secured to first outlet 510 of spray head 408. Aircap 516 seals nozzle 514 of FIG. 5 within first outlet 510. Aircap 520 is secured to second outlet 512 of spray head 408. Aircap 520 seals nozzle 518 of FIG. 5 within second outlet 512.

Figure 13:
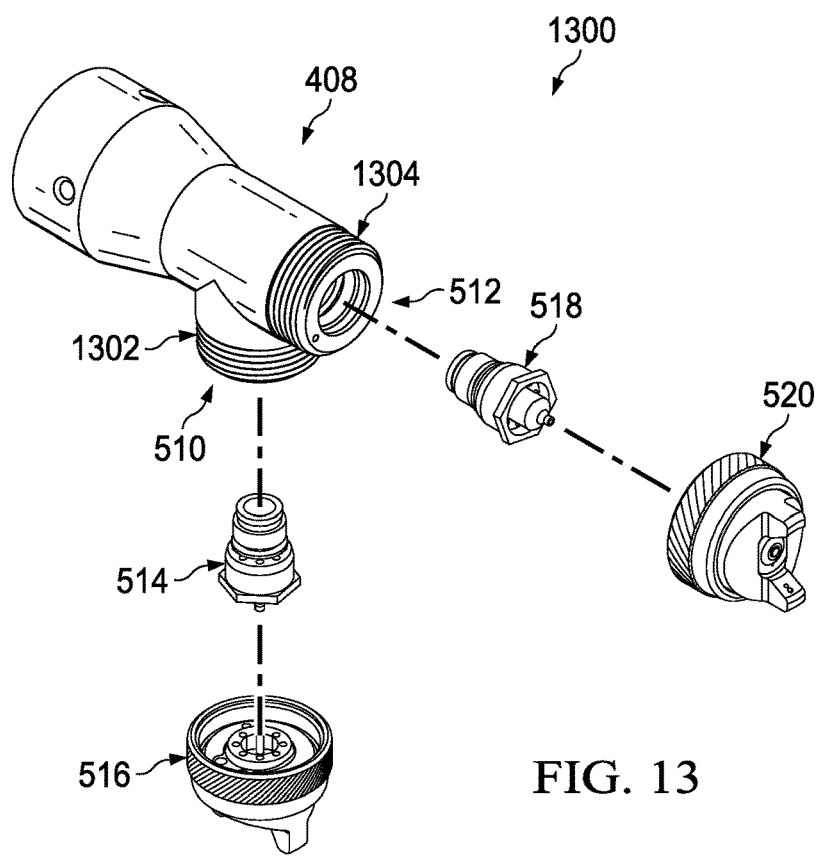
FIG. 13 is an illustration of an exploded view of a spray head with nozzles and aircaps in accordance with an illustrative embodiment.

Turning now to FIG. 13, an illustration of an exploded view of a spray head with nozzles and aircaps is depicted in accordance with an illustrative embodiment. View 1300 is an exploded view of spray head 408 and associated nozzles and aircaps.

View 1300 is a closer exploded view of spray head 408, aircaps, and nozzles of FIG. 5. In view 1300, threads 1302 of first outlet 510 are visible. To secure nozzle 514 within first outlet 510, aircap 516 is secured to first outlet 510 using threads 1302. In view 1300, threads 1304 of second outlet 512 are visible. To secure nozzle 518 within second outlet 512, aircap 520 is secured to second outlet 512 using threads 1304.

Figure 14:
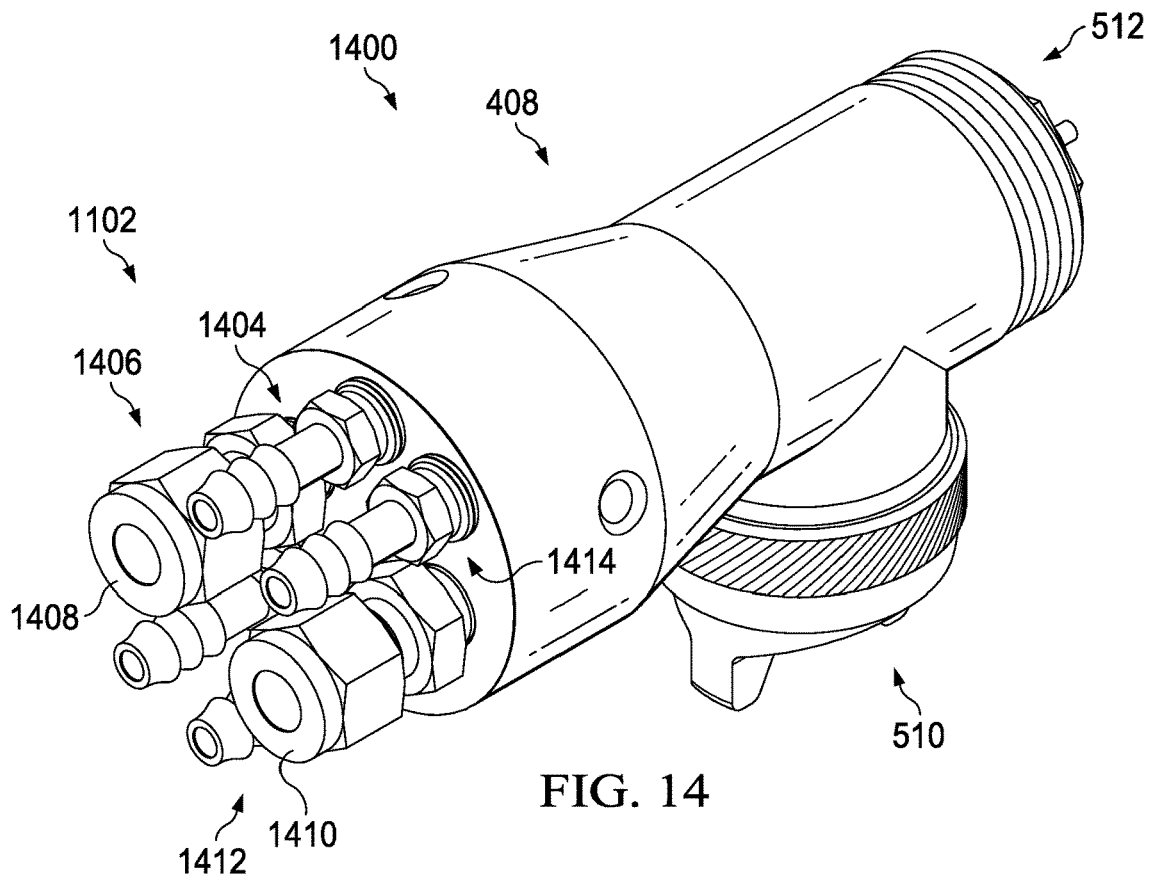
FIG. 14 is an illustration of a back isometric view of a spray head with fittings in accordance with an illustrative embodiment.

Turning now to FIG. 14, an illustration of a back isometric view of a spray head with fittings is depicted in accordance with an illustrative embodiment. View 1400 is a back isometric view of spray head 408 and associated nozzles, fittings, and aircaps.

As depicted, fittings 1102 comprise air fittings 1404 and fluid fittings 1406. Fluid fittings 1406 include fluid fitting 1408 providing fluid to first outlet 510 and fluid fitting 1410 providing fluid to second outlet 512. Air fittings 1404 include air fittings 1412 providing air to first outlet 510 and air fittings 1414 providing air to second outlet 512.

Fittings 1102 will be connected to flexible conduits 602. As depicted, the quantity of fittings 1102 is the same as the quantity of flexible conduits 602. Each of flexible conduits 602 will connect to a respective fitting of fittings 1102.

As depicted, fittings 1102 comprises six fittings. Fittings 1102 includes three fittings for each outlet, one fluid fitting and two air fittings. Air fittings 1412 includes two air fittings. Air fittings 1414 includes two air fittings.

In other illustrative examples, spray head 408 may include a different quantity of fittings. For example, spray head 408 may have more than two outlets. In some illustrative examples, when spray head 408 has more than two outlets, the quantity of fittings will be greater than six. In one illustrative example, when spray head 408 has three outlets, the quantity of fittings will be nine fittings. When spray head 408 has less than two outlets, the quantity of fittings will be less than six. For example, in some illustrative examples, spray head 408 may only have three fittings.

Figure 15:
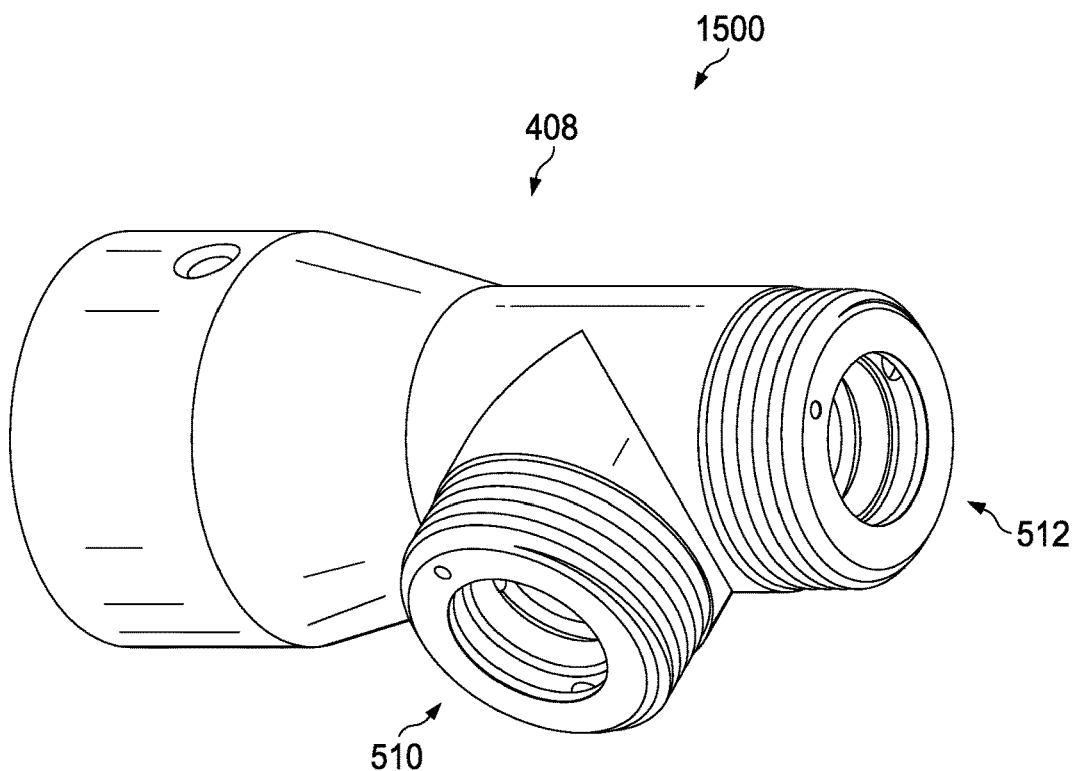
FIG. 15 is an illustration of an isometric view of a spray head in accordance with an illustrative embodiment.

Turning now to FIG. 15, an illustration of an isometric view of a spray head is depicted in accordance with an illustrative embodiment. View 1500 is an isometric view of spray head 408.

In view 1500, first outlet 510 and second outlet 512 are visible. As can be seen in view 1500, first outlet 510 and second outlet 512 are directed at ninety degrees relative to each other.

Figure 16:
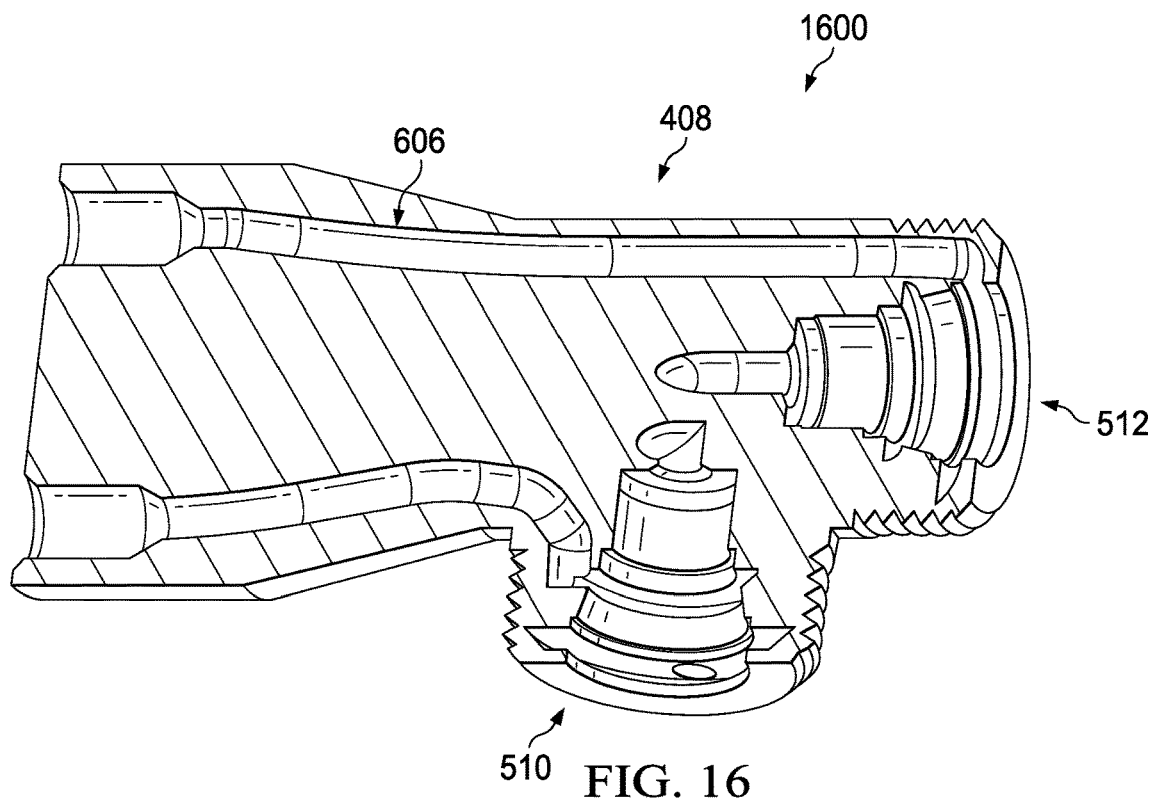
FIG. 16 is an illustration of a cross-sectional view of a spray head in accordance with an illustrative embodiment.

Turning now to FIG. 16, an illustration of a cross-sectional view of a spray head is depicted in accordance with an illustrative embodiment. View 1600 is a cross-sectional view of spray head 408.

Figure 17:
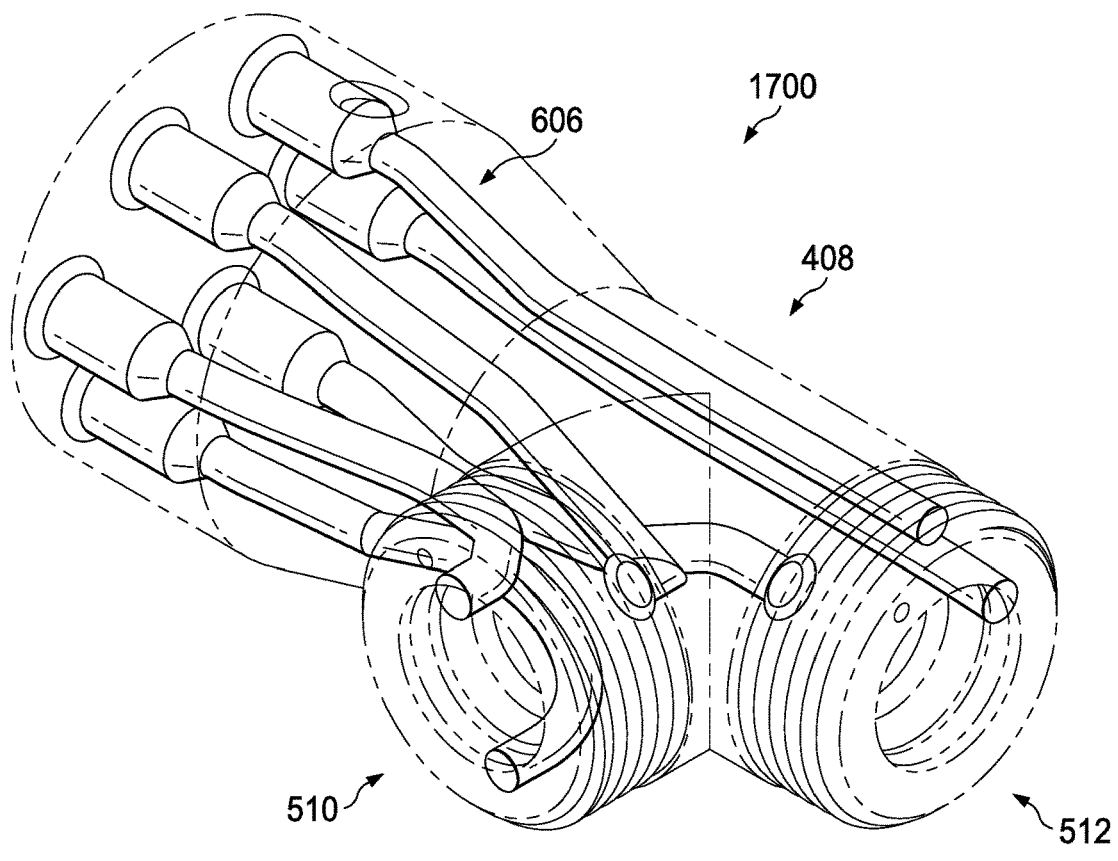
FIG. 17 is an illustration of a partially transparent view of a spray head in accordance with an illustrative embodiment.

Turning now to FIG. 17, an illustration of a partially transparent view of a spray head is depicted in accordance with an illustrative embodiment. View 1700 is a transparent view of spray head 408 of FIG. 4.

In view 1700, the material of spray head 408 is transparent while the boundaries of integral channels 606 are solid.

Spray head 408 is shown as only one non-limiting example of a physical implementation of spray head 208 of FIG. 2. Spray head 208 may have any desirable number of outlets. In some illustrative examples, spray head 208 may have only one outlet. In other illustrative examples, spray head 208 may have more than two outlets.

Further, integral channels 216 may have any desirable shape or path within spray head 208. Integral channels 606 are only one non-limiting example of integral channels that may be present within spray head 408. Integral channels 606 are only one non-limiting example of integral channels 216 of FIG. 2.

The different components shown in FIGS. 1 and 3-17 may be combined with components in FIG. 2, used with components in FIG. 2, or a combination of the two. Additionally, some of the components in FIGS. 1 and 3-17 may be illustrative examples of how components shown in block form in FIG. 2 may be implemented as physical structures.

Figure 18:
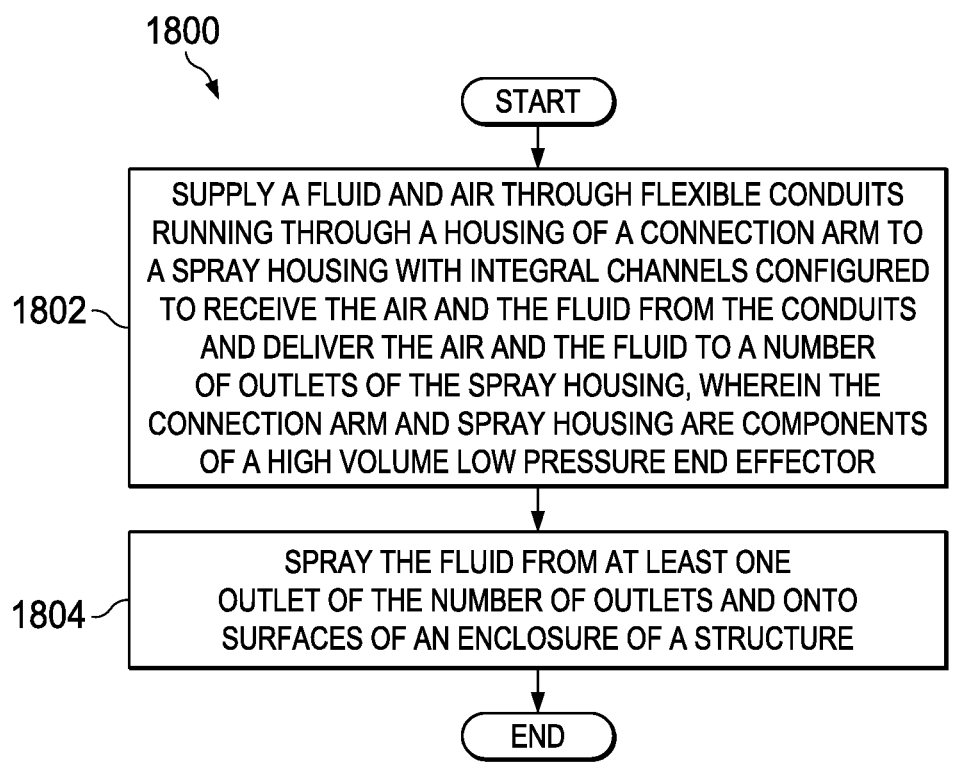
FIG. 18 is an illustration of a flowchart of a method for applying a fluid to surfaces of an enclosure of a structure in accordance with an illustrative embodiment.

Turning now to FIG. 18, an illustration of a flowchart of a method for applying a fluid to surfaces of an enclosure of a structure is depicted in accordance with an illustrative embodiment. Method 1800 may apply a fluid to at least one component of aircraft 100 of FIG. 1. Method 1800 may take place in manufacturing environment 200 of FIG. 2 using high-volume low-pressure end effector 204. Method 1800 may take place in manufacturing environment 300 of FIG. 3. Method 1800 may be performed using high-volume low-pressure end effector 400 of FIGS. 4-17.

Method 1800 supplies a fluid and air through flexible conduits running through a housing of a connection arm to a spray head with integral channels configured to receive the air and the fluid from the conduits and deliver the air and the fluid to a number of outlets of the spray head, wherein the connection arm and spray head are components of a high-volume low-pressure end effector (operation 1802). Method 1800 sprays the fluid from at least one outlet of the number of outlets and onto surfaces of an enclosure of a structure (operation 1804). Afterwards, the method terminates.

Figure 19:
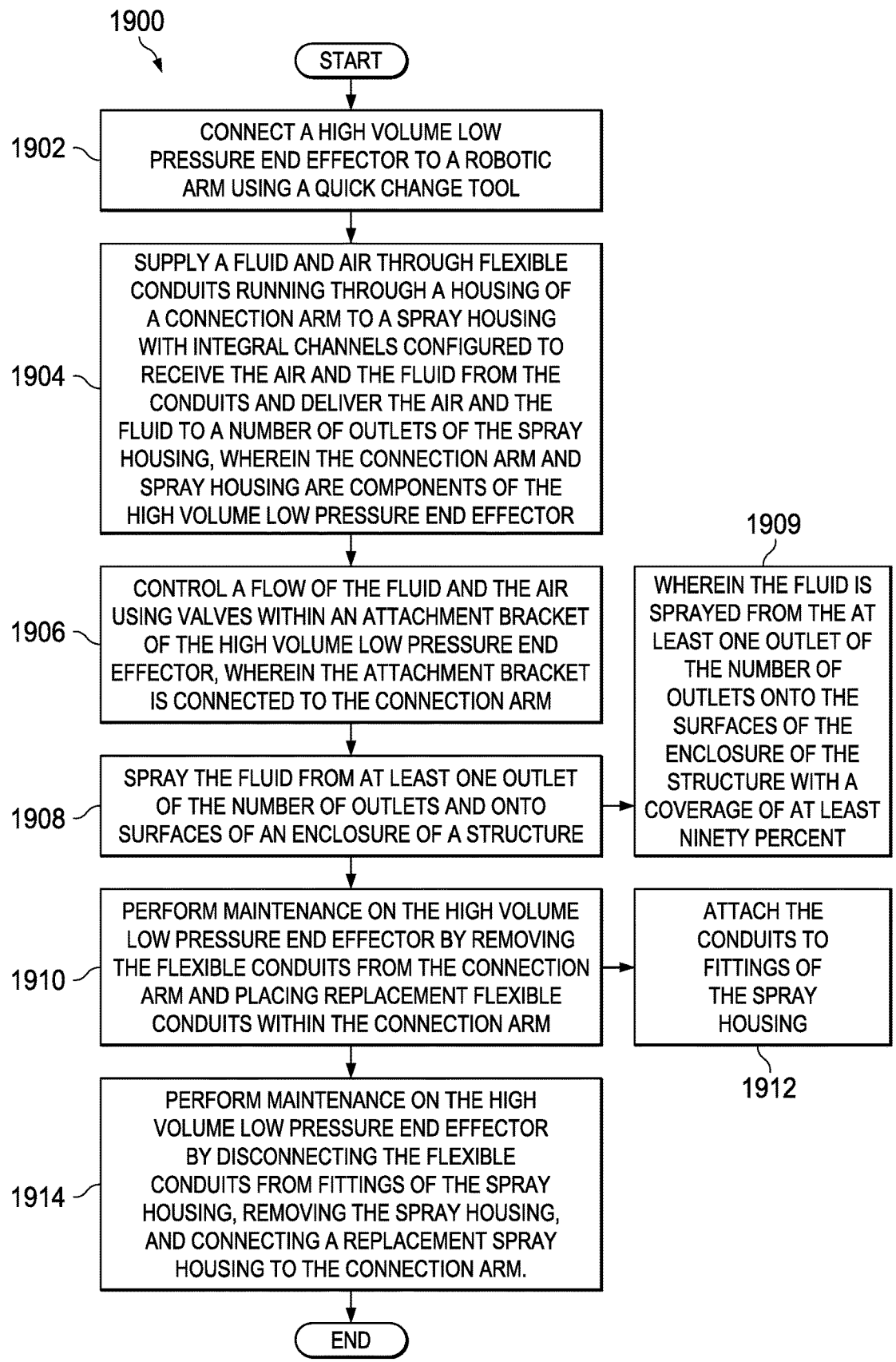
FIG. 19 is an illustration of a flowchart of a method for applying a fluid to surfaces of an enclosure of a structure in accordance with an illustrative embodiment.

Turning now to FIG. 19, an illustration of a flowchart of a method for applying a fluid to surfaces of an enclosure of a structure is depicted in accordance with an illustrative embodiment. Method 1900 may apply a fluid to at least one component of aircraft 100 of FIG. 1. Method 1900 may take place in manufacturing environment 200 of FIG. 2 using high-volume low-pressure end effector 204. Method 1900 may take place in manufacturing environment 300 of FIG. 3. Method 1900 may be performed using high-volume low-pressure end effector 400 of FIGS. 4-17.

Method 1900 connects a high-volume low-pressure end effector to a robotic arm using a quick-change tool (1902). Method 1900 supplies a fluid and air through flexible conduits running through a housing of a connection arm to a spray head with integral channels configured to receive the air and the fluid from the conduits and deliver the air and the fluid to a number of outlets of the spray head, wherein the connection arm and spray head are components of the high-volume low-pressure end effector (operation 1904). Method 1900 controls a flow of the fluid and the air using valves within an attachment bracket of the high-volume low-pressure end effector, wherein the attachment bracket is connected to the connection arm (operation 1906). Method 1900 sprays the fluid from at least one outlet of the number of outlets and onto surfaces of an enclosure of a structure (operation 1908). In some illustrative examples, the fluid is sprayed from the at least one outlet of the number of outlets and onto the surfaces of the enclosure of the structure with a coverage of at least 90 percent (operation 1909).

Method 1900 performs maintenance on the high-volume low-pressure end effector by removing the flexible conduits from the connection arm and placing replacement flexible conduits within the connection arm (operation 1910). In some illustrative examples, performing maintenance further comprises attaching the conduits to fittings of the spray head (operation 1912).

Method 1900 performs maintenance on the high-volume low-pressure end effector by disconnecting the flexible conduits from fittings of the spray head, removing the spray head, and connecting a replacement spray head to the connection arm (operation 1914). Afterwards, the method terminates.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

Figure 20:
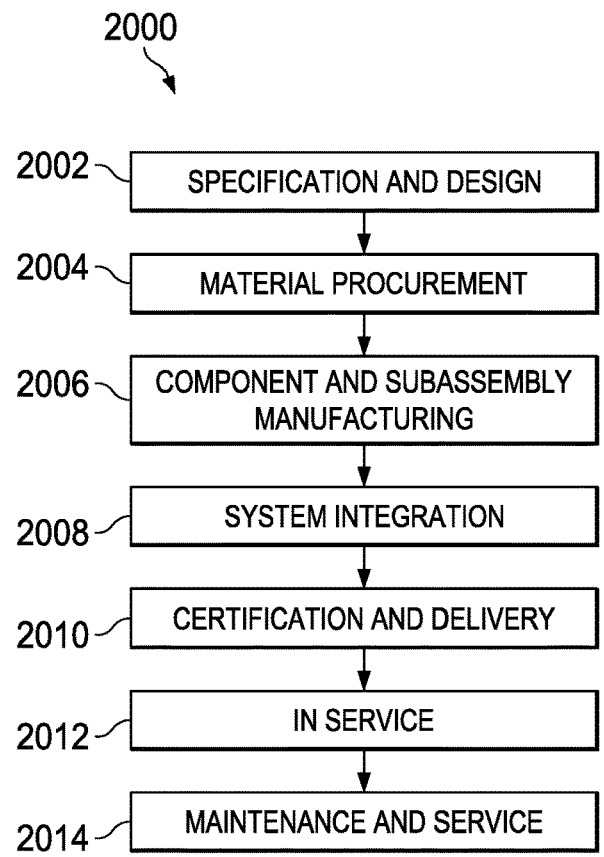
FIG. 20 is an illustration of an aircraft manufacturing and service method in the form of a block diagram in accordance with an illustrative embodiment.
Figure 21:
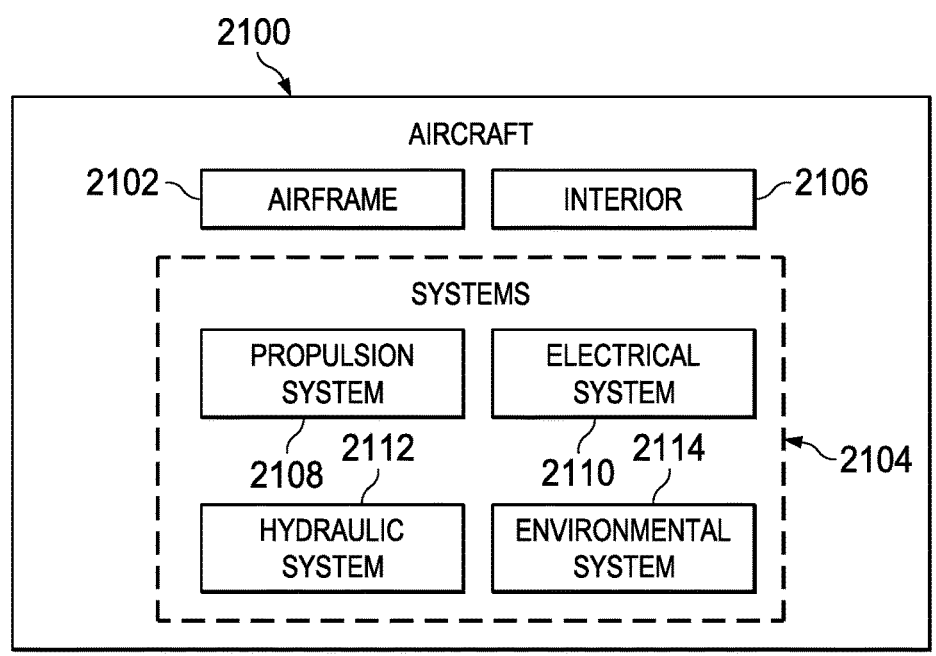
FIG. 21 is an illustration of an aircraft in the form of a block diagram in which an illustrative embodiment may be implemented.

Illustrative embodiments of the present disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During preproduction, aircraft manufacturing and service method 2000 may include specification and design 2002 of aircraft 2100 in FIG. 21 and material procurement 2004.

During production, component and subassembly manufacturing 2006 and system integration 2008 of aircraft 2100 takes place. Thereafter, aircraft 2100 may go through certification and delivery 2010 in order to be placed in service 2012. While in service 2012 by a customer, aircraft 2100 is scheduled for routine maintenance and service 2014, which may include modification, reconfiguration, refurbishment, or other maintenance and service.

Each of the processes of aircraft manufacturing and service method 2000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in which an illustrative embodiment may be implemented. In this example, aircraft 2100 is produced by aircraft manufacturing and service method 2000 of FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2000.

One or more illustrative embodiments may be used during at least one of component and subassembly manufacturing 2006, system integration 2008, or maintenance and service 2014 of FIG. 20. For example, high-volume low-pressure end effector 204 of FIG. 2 may be used during component and subassembly manufacturing 2006 to spray a coating onto portions of airframe 2102 of FIG. 21. High-volume low-pressure end effector 204 of FIG. 2 may be used during component and subassembly manufacturing 2006 according to method 1800 of FIG. 18 or method 1900 of FIG. 19.

Fluid 202 may be sprayed onto components of aircraft 2100 using high-volume low-pressure end effector 204 of FIG. 2 during system integration 2008. High-volume low-pressure end effector 204 may be used to spray a coating such as fluid 202 of FIG. 2 on replacement components used during maintenance and service 2014 of FIG. 20. Structure 270 may be at least a component of airframe 2102.

In some large enclosures, a long reach is required for high coverage. The illustrative examples provide an end of arm tooling with the ability to reach into the tight areas of a spar cavity and able to spray with both a zero degree spray tip as well as a ninety degree spray tip. The illustrative examples provide a system that is high-volume low-pressure (HVLP) compliant. The illustrative examples are safer for the manufacturing environment and operators than non-HVLP conventional end effectors.

The illustrative examples provide a high-volume low-pressure end effector with significantly increased coverage over conventional end effectors. The coverage of the high-volume low-pressure end effector of the illustrative examples is increased due to an increased length of the connection arm of the high-volume low-pressure end effector compared to conventional end effectors. The coverage of the high-volume low-pressure end effector of the illustrative examples is also increased due to the high-volume low-pressure capacity of the illustrative examples.

When coverage is increased, utilization of the robotic system having high-volume low-pressure end effector may also be higher than utilization of conventional end effectors. By increasing utilization of automation, the time to apply a coating to a structure is reduced. For example, increasing utilization of automation reduces the time to paint a wing. Increasing automation reduces manual application of coatings. Reducing manual application of coatings removes operators from an environment with airborne coatings. Reducing manual application of coatings reduces operator exposure to airborne coatings.

The illustrative examples present a high-volume low-pressure end effector with a lower weight than conventional end effectors. Several of the components of the high-volume low-pressure end effector are hollow to reduce the weight of the end effector compared to conventional end effectors.

The illustrative examples present a high-volume low-pressure end effector with better maintainability than conventional end effectors. Maintenance time is reduced by having fewer components. For example, high-volume low-pressure end effector does not have o-rings.

Further, at least one of maintenance time or maintenance cost may be reduced by having easily replicable and replaceable components. The use of flexible conduits allows for replacement of the conduits without replacing the whole of the connection arm. Not replacing the housing may result in less material waste and lower maintenance cost. By only replacing the flexible conduits during maintenance, the cost of maintenance may be reduced. For example, the flexible conduits may be formed of inexpensive material. As another example, the flexible conduits may be commercially available. By providing flexible conduits, different designs of the spray head may be interchangeable within the high-volume low-pressure end effector.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A high-volume low-pressure end effector comprising:
    a connection arm comprising a housing with flexible conduits running through the housing;
    a spray head connected to the connection arm, the spray head comprising:
        integral channels connected to the flexible conduits and comprising a first air channel, a second air channel, and a fluid channel; and
        a number of outlets in fluid communication with the integral channels, wherein the spray head, the number of outlets, and the integral channels form a substantially monolithic structure, and wherein the integral channels are configured to:
            connect the flexible conduits to the number of outlets;
            receive air and a fluid from the flexible conduits; and
            deliver the air and the fluid to the number of outlets;

a quick-change connector configured to removably connect the high-volume low-pressure end effector to a robotic arm;
an attachment bracket configured to attach the connection arm to the connector, the attachment bracket having a first end attached to the connection arm and a second opposite end attached to the connector; and
valves positioned within the attachment bracket and configured to control a flow of the air and the fluid through the flexible conduits.

2. The high-volume low-pressure end effector of claim 1 wherein the number of outlets comprises a first outlet and a second outlet connected to the integral channels.

3. The high-volume low-pressure end effector of claim 2 further comprising:
a respective nozzle and aircap for each of the first outlet and the second outlet.

4. The high-volume low-pressure end effector of claim 2, wherein the first outlet and the second outlet are pointed ninety degrees relative to each other.

5. The high-volume low-pressure end effector of claim 1, wherein the housing has a circular cross-section.

6. The high-volume low-pressure end effector of claim 1 further comprising:
fittings connecting the flexible conduits in the connection arm to the integral channels of the spray head.

7. The high-volume low-pressure end effector of claim 6, wherein the fittings comprise a number of air fittings and a number of fluid fittings.

8. The high-volume low-pressure end effector of claim 7, wherein the number of air fittings comprises two air fittings per outlet, and wherein the number of fluid fittings comprises one fluid fitting per outlet.

9. The high-volume low-pressure end effector of claim 1, wherein the housing is a hollow metal housing.

10. A method comprises:
providing a spray head having integral channels in fluid communication with a number of outlets disposed therein, wherein the spray head, the integral channels, and the number of outlets form a substantially monolithic structure;
supplying a fluid and air through flexible conduits running through a housing of a connection arm connected to the spray head, wherein:
the integral channels are configured to receive the air and the fluid from the flexible conduits, and deliver the air and the fluid to the number of outlets of the spray head, wherein the integral channels comprise a first air channel, a second air channel, and a fluid channel; and
the connection arm and the spray head are components of a high-volume low-pressure end effector;
a quick-change connector is configured to removably connect the high-volume low-pressure end effector to a robotic arm;
an attachment bracket is configured to attach the connection arm to the connector, the attachment bracket having a first end attached to the connection arm and a second opposite end attached to the connector; and
valves are positioned within the attachment bracket and configured to control a flow of the air and the fluid through the flexible conduits; and
spraying the fluid from at least one outlet of the number of outlets and onto surfaces of an enclosure of a structure.

11. The method of claim 10, wherein the fluid is sprayed from the at least one outlet of the number of outlets onto the surfaces of the enclosure of the structure with a coverage of at least 90 percent.

12. The method of claim 10 further comprising:
controlling a flow of the fluid and the air using the valves within the attachment bracket of the high-volume low-pressure end effector.

13. The method of claim 10 further comprising:
performing maintenance on the high-volume low-pressure end effector by removing the flexible conduits from the connection arm and placing replacement flexible conduits within the connection arm.

14. The method of claim 10 further comprising:
performing maintenance on the high-volume low-pressure end effector by disconnecting the flexible conduits from fittings of the spray head, removing the spray head, and connecting a replacement spray head to the connection arm.

15. A high-volume low-pressure end effector comprising:
an attachment bracket containing valves for air and fluid;
a connection arm comprising a hollow metal housing with flexible conduits running through the hollow metal housing, the flexible conduits carrying the air and the fluid;
fittings connecting the flexible conduits to integral channels within a spray head, the integral channels comprising a first air channel, a second air channel, and a fluid channel;
the spray head comprising a number of outlets in fluid communication with the integral channels, wherein the integral channels are configured to deliver the fluid and the air to the number of outlets;
the spray head, the number of outlets, and the integral channels form a substantially monolithic structure;
a quick-change connector configured to removably connect the high-volume low-pressure end effector to a robotic arm;
the attachment bracket configured to attach the connection arm to the connector, the attachment bracket having a first end attached to the connection arm and a second opposite end attached to the connector; and
the valves positioned within the attachment bracket and configured to control a flow of the air and the fluid through the flexible conduits.

16. The high-volume low-pressure end effector of claim 15 further comprising:
a respective aircap threaded on to each of the number of outlets, wherein each respective aircap encloses a respective nozzle within each of the number of outlets.

17. The high-volume low-pressure end effector of claim 16, wherein the number of outlets comprises a first outlet and a second outlet facing 90 degrees from each other.

18. The high-volume low-pressure end effector of claim 15, wherein the hollow metal housing has a circular cross-section.

19. A high-volume low-pressure end effector comprising:
a connection arm comprising a housing with flexible conduits running through the housing; and
a spray head comprising integral channels and a number of outlets in fluid communication with the integral channels, wherein the integral channels are connected to the flexible conduits and comprise a first air channel, a second air channel, and a fluid channel, and wherein the spray head, the number of outlets, and the integral channels form a substantially monolithic structure;

the integral channels are configured to:
receive air and a fluid from the flexible conduits; and deliver the air and the fluid to the number of outlets;
the number of outlets comprises a first outlet and a second outlet connected to the integral channels of the spray head;
the first outlet and the second outlet have a respective nozzle and aircap;
the first outlet and the second outlet are pointed ninety degrees relative to each other;
a quick-change connector configured to removably connect the high-volume low-pressure end effector to a robotic arm;
an attachment bracket configured to attach the connection arm to the connector, the attachment bracket having a first end attached to the connection arm and a second opposite end attached to the connector; and
valves positioned within the attachment bracket and configured to control a flow of the air and the fluid through the flexible conduits.

20. The high-volume low-pressure end effector of claim 19, wherein the housing has a circular cross-section.

21. The high-volume low-pressure end effector of claim 19, further comprising:
fittings connecting the flexible conduits in the connection arm to the integral channels of the spray head.

22. The high-volume low-pressure end effector of claim 21, wherein the fittings comprise a number of air fittings and a number of fluid fittings.

23. The high-volume low-pressure end effector of claim 19, wherein the housing is a hollow metal housing.

24. The high-volume low-pressure end effector of claim 1, further comprising pins configured to removably connect the connection arm to the spray head and align the spray head within the high-volume low-pressure end effector.

25. The high-volume low-pressure end effector of claim 1, wherein the spray head reduces in cross-sectional area between a first end of the spray head to a second end of the spray head including a transitional portion between the cross-sectional area of the first end and the cross-sectional area of the second end, wherein the first end of the spray head is connected to the connection arm.

26. The high-volume low-pressure end effector of claim 1, wherein the flexible conduits include two flexible conduits configured to provide the air to the first air channel and the second air channel which provide the air to a first outlet of the number of outlets, one flexible conduit configured to provide the fluid to the fluid channel which provides the fluid to the first outlet of the number of outlets, two other flexible conduits configured to provide the air to a third air channel of the integral channels and a fourth air channel of the integral channels which provide the air to a second outlet of the number of outlets, and one other flexible conduit configured to provide the fluid to a second fluid channel of the integral channels which provides the fluid to the second outlet of the number of outlets.

* * * * *